United States Patent [19]

Chang et al.

[11] Patent Number: 5,359,910
[45] Date of Patent: Nov. 1, 1994

[54] BICYCLE FRONT FORK SHOCK ABSORBING MECHANISM

[75] Inventors: Wu-Sung Chang; Huan-Yang Huang, both of Changhwa Hsien,

[73] Assignee: Bettis Corporation, Waller, Tex.

[21] Appl. No.: 174,405

[22] Filed: Dec. 28, 1993

[51] Int. Cl.$^5$ ............................................ B62K 21/14
[52] U.S. Cl. .................................. 74/551.2; 74/551.1; 280/276; 280/279
[58] Field of Search .......................... 74/551.1–551.8; 280/279, 276, 281.1, 277

[56] References Cited

U.S. PATENT DOCUMENTS

| | | | |
|---|---|---|---|
| 4,553,769 | 11/1985 | Kawaguchi | 280/276 |
| 4,971,344 | 11/1990 | Turner | 280/276 |
| 5,088,705 | 2/1992 | Tsai | 280/276 X |
| 5,094,324 | 3/1992 | Tsai | 280/276 X |
| 5,186,481 | 2/1993 | Turner | 280/279 |
| 5,193,833 | 3/1993 | Reisinger | 280/276 |
| 5,238,259 | 8/1993 | Wilson et al. | 280/279 X |
| 5,269,549 | 12/1993 | Wilson et al. | 280/277 X |
| 5,275,264 | 1/1994 | Isella | 280/276 X |
| 5,284,352 | 2/1994 | Chen | 280/276 |

FOREIGN PATENT DOCUMENTS 0508134 10/1992 European Pat. Off. ............ 280/276

*Primary Examiner*—Vinh T. Luong
*Attorney, Agent, or Firm*—Robert W. B. Dickerson

[57] ABSTRACT

A bicycle front fork shock absorbing mechanism includes a lower cylindrical casing having a lower rubber ring above an inside screw hole thereof and a friction lining around the inside wall thereof, and upper cylindrical casing inserted into the lower cylindrical casing to hold a stack of upper rubber rings by a locating block, a friction ring mounted around the lower cylindrical casing in contact with the friction lining through a slide contact, a shock absorbing conical spring retained between the upper rubber rings and the lower rubber ring, and a screw rod having a head stopped above the locating block and a screw rod inserted in proper order through a hole on the locating block, the upper rubber rings, the shock absorbing conical springs, and the lower rubber ring and then threaded into the screw hole on the lower cylindrical casing.

1 Claim, 3 Drawing Sheets

BICYCLE FRONT FORK SHOCK ABSORBING MECHANISM

BACKGROUND AND SUMMARY OF THE INVENTION

The present invention relates to a bicycle front fork, and relates more particularly to a shock absorbing mechanism for the front fork of a bicycle.

The fork blades of the front fork of a bicycle are commonly and respectively made in two parts, namely, the upper cylindrical casing and the lower cylindrical casing. The upper cylindrical casing has a top end fastened to the blade holder of the front fork and a bottom end fastened with an upper spring holder made to slide in the lower cylindrical casing. The lower cylindrical casing is supported on either end of the front wheel axle of the bicycle, having a lower spring holder fastened on the inside. A compression spring is received inside the lower cylindrical casing and retained between the upper spring holder and the lower spring holder. Because only the compression spring is provided to absorb shocks and the compression spring is made uniform in diameter, the shock absorbing ability is not sufficient. Further, if the compression spring is made of metal, it will rub against the inside wall of the lower cylindrical casing producing noises when the bicycle suddenly runs over an uneven road surface. If the compression spring is made of plastics (for example: polyurethane), it can not effectively absorb shocks as the bicycle moves over a continuously rugged road surface. As the upper cylindrical casing is made to slide in the lower cylindrical casing, the outside surface of the upper cylindrical casing frequently rubs against the inside surface of the lower cylindrical casing, causing the upper and lower cylindrical casings to wear out quickly. Because the upper cylindrical casing and the lower cylindrical casing are linked together simply by the compression springs, the upper cylindrical casing may jump out of the lower cylindrical casing, causing an accident to happen. Therefore, this structure of bicycle front fork is not safe in use. Still another drawback of this structure of bicycle front fork is that the spring force of the compression spring in either fork blade of the front fork can not be regulated. If spring force of the compression springs in the two fork blades of the front fork are not in balance due to different elastic fatique after long uses, the compression springs must be replaced. Still another drawback of this structure of bicycle front fork is that the lower cylindrical casing is complicated to manufacture. As the lower cylindrical casing is made of an aluminum alloy through a forging process, it must be made having a tapered inside wall so that it can be conveniently removed from the forging die. After the process of forging, the tapered inside wall of the lower cylindrical casing must be processed again so that the upper cylindrical casing can slide within the inside wall of the lower cylindrical casing. This complicated processing process greatly increases the manufacturing cost and time of the bicycle front fork. A yet further drawback of this structure of bicycle front fork is that there is not any guide means to guide the compression spring as the compression spring is compressed, therefore the compression spring will rub against the inside wall of the lower cylindrical casing causing noises to happen. As the compression spring is frequently forced to rub against the inside wall of the lower cylindrical casing, it may be damaged easily.

The present invention has been accomplished to provide a bicycle front fork shock absorbing mechanism which eliminates the aforesaid problems. According to the preferred embodiment of the present invention, the bicycle front fork shock absorbing mechanism comprises a lower cylindrical casing having a lower rubber ring above an inside screw hole thereof and a friction lining around the inside wall thereof, an upper cylindrical casing inserted into the lower cylindrical casing to hold a stack of upper rubber rings by a locating block, a friction ring mounted around the lower cylindrical casing in contact with the friction lining through a slide contact, a shock absorbing conical spring retained between the upper rubber rings and the lower rubber ring, and a screw rod having a head stopped above the locating block. The screw rod is inserted in proper order through a hole on the locating block, the upper rubber rings, the shock absorbing conical spring, and the lower rubber ring and then threaded into the screw hole on the lower cylindrical casing. The arrangement of the friction lining inside the lower cylindrical casing eliminates the processing process to grind the inside wall of the lower cylindrical casing. The arrangement of the upper and lower rubber rings and the shock absorbing conical spring effectively absorb shocks of different frequencies in different directions. The slide contact between the friction lining on the lower cylindrical casing and the friction ring on the upper cylindrical casing eliminates noises during the relative movement between the upper and lower cylindrical casings. Further, the arrangement of the headed adjusting screw rod permits the spring force of the shock absorbing conical spring to be adjustable, and simultaneously guide the shock absorbing conical spring in course as the shock absorbing conical spring is alternatively compressed and released.

DETAILED DESCRIPTION OF THE PREFERRED EMBODIMENT

Figure 1:
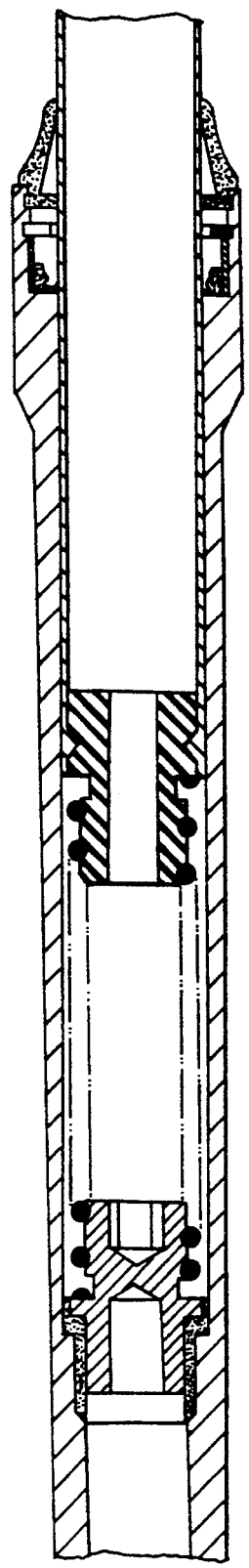
FIG. 1 is a longitudinal view in section of a fork blade of a bicycle front fork according to the prior art.
Figure 2:
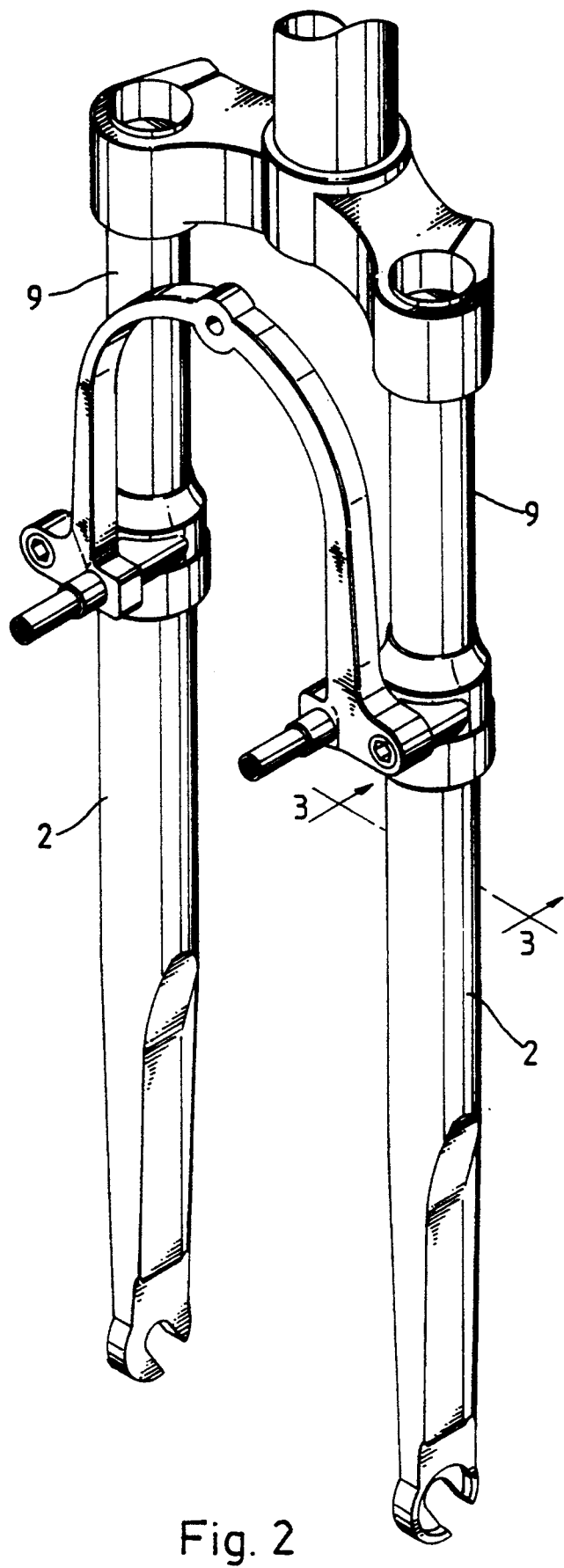
FIG. 2 is an elevational view of a bicycle front fork according to the present invention.
Figure 3:
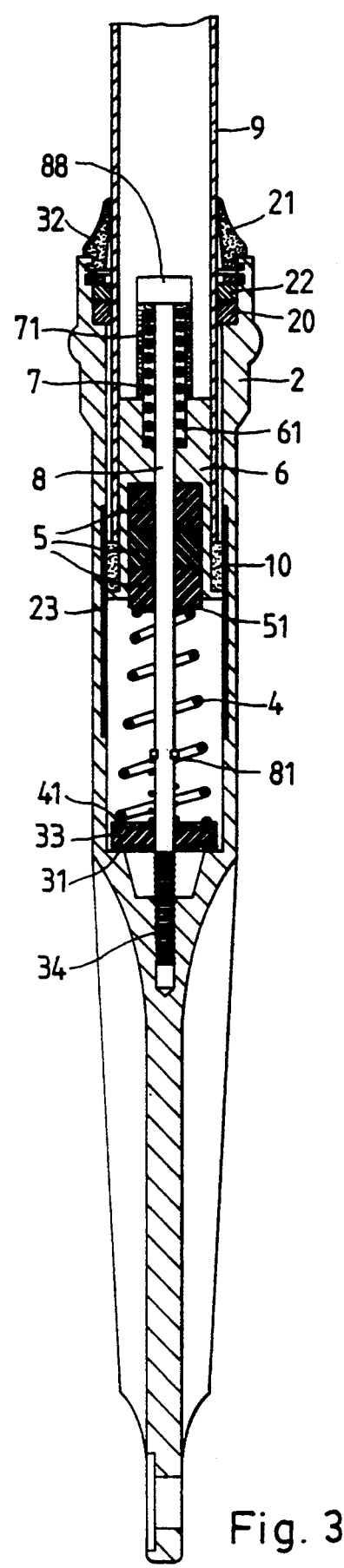
FIG. 3 is longitudinal view in section of one fork blade of the bicycle front fork along line 3—3 of FIG. 2 (before compression).

Referring to FIGS. 2 and 3, the front fork of a bicycle includes two fork blades, each fork blade comprised of an upper cylindrical casing 9 and a lower cylindrical casing 2. The upper cylindrical casing 9 is made to slide in the lower cylindrical casing 2. A shock absorbing mechanism is installed inside the upper cylindrical casing 9 and the lower cylindrical casing 2 to absorb shocks, and comprised of a lower rubber ring 33, a shock spring 4, a plurality of upper rubber rings 5, a locating block 6, a buffer spring 7, a headed adjusting screw rod 8, a friction ring 10, and a bushing 20.

The lower cylindrical casing 2 is made of aluminum alloy through a forging process, having a dust protective cap 21 and an oil seal ring 22 at the top and fastened around the upper cylindrical casing 9 near the top opening 32 of the lower cylindrical casing 2. A tubular friction lining 23 is provided on the inside of the lower cylindrical casing 2. The installation of the tubular friction lining 23 on the inside of the lower cylindrical casing 2 eliminates the processing process to polishing the inside wall of the lower cylindrical casing 2.

The lower rubber ring 33 is made of polyurethane rubber fastened inside the lower cylindrical casing 2 and spaced below the tubular friction lining 23 and supported above a washer 31. As an alternate form of the present invention, a plastic spring may be installed replace the lower rubber ring 33.

The shock spring 4 is a conical spring made gradually bigger toward the bottom and received inside the lower cylindrical casing 2 and supported on a washer 41 above the lower rubber ring 33.

The upper rubber rings 5 are made of polyurethane rubber and received inside the lower cylindrical casing 2 and supported on a washer 51 above the shock spring 4. Alternatively, plastic springs may be installed to replace the upper rubber rings 5.

The locating block 6 is made of cylindrical shape fastened inside the upper cylindrical casing 9 at the bottom to hold the upper rubber rings 5 above the shock spring 4, having a stepped through hole 61 through the longitudinal center line thereof.

The buffer spring 7 is received in a protective sleeve 71 inside the upper cylindrical casing 9, having a bottom end inserted in the stepped through hole 61 on the locating block 6 and a top end stopped at the head 88 of the headed adjusting screw rod 8.

The headed adjusting screw rod 8 is inserted through the buffer spring 7, the stepped through hole 61 on the locating block 6, the upper rubber rings 5, the washer 51 between the upper rubber rings 5 and the shock spring 4, the shock spring 4, the washer 41 between the shock spring 4 and the lower rubber ring 33, the lower rubber ring 33, the washer 31 beneath the lower rubber ring 33, and then threaded into a screw hole 34 inside the lower cylindrical casing 2. A retainer spring 81 is mounted around the headed adjusting screw rod 8, having one end affixed to the headed adjusting screw rod 8 and an opposite end affixed to the washer 41.

As indicated, the upper cylindrical casing 9 has a bottom end moved to slide in the lower cylindrical casing 2. As the bottom end of the upper cylindrical 9 is moved in the lower cylindrical casing 2, the locating block 6 which is fastened to the bottom end of the upper cylindrical casing 9 is forced to move the upper rubber rings 5 downwards causing the shock spring 4 compressed, and therefore shocks are eliminated or lessened.

The friction ring 10 is mounted around the bottom end of the upper cylindrical casing 9 on the outside. As the upper cylindrical casing 9 and the lower cylindrical casing 2 are moved relative to each other, a slide contact occurs between the friction ring 10 and the tubular friction lining 23.

The bushing 20 is made of wear resistant copper alloy mounted within the lower cylindrical casing 2 near the top and retained beneath the oil seal ring 22. The bushing 20 will rub against the upper cylindrical casing 9 through a slide contact as the lower cylindrical casing 2 moves vertically relative to the upper cylindrical casing 9.

Figure 4:
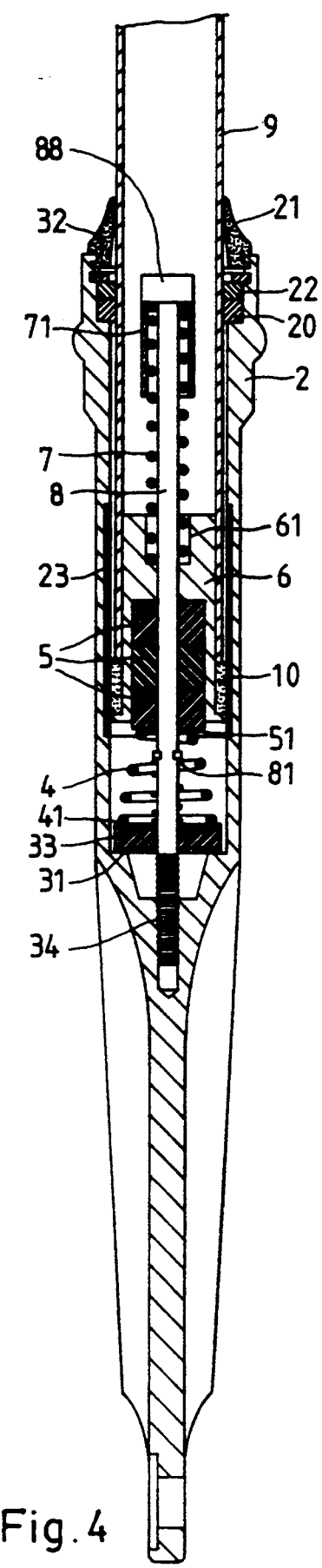
FIG. 4 is similar to FIG. 3 but showing the shock absorbing mechanism thereof compressed.

Referring to FIG. 4 and FIG. 3 again, as the bicycle moves over an uneven road surface, the lower cylindrical casing 2 will be forced to move up and down relative to the upper cylindrical casing 9, and shocks will be transmitted from the lower cylindrical casing 2 through the lower rubber ring 33, the shock spring 4, and the upper rubber rings 5. While passing through the lower rubber ring 33, the shock spring 4, and the upper rubber rings 5, shocks are absorbed or lessened. The shock spring 4 is a conical spring, and it effectively absorbs shocks in all directions.

The bicycle front fork shock absorbing mechanism of the present invention provides numerous advantages. As the shock spring 4 and the lower and upper rubber rings 33, 5 have different spring force, they can absorb shocks of different frequencies in different directions, and therefore shocks can be effectively absorbed when the bicycle runs suddenly over a hollow in the road or a rugged road surface. The arrangement of the buffer spring can absorb shocks transmitted to the headed adjusting screw rod. The buffer spring also gives a downward pressure to the locating block causing the upper rubber rings to firmly stopped against the shock spring. Because the shock spring 4 is retained between the upper rubber rings 5 and the lower rubber ring 33 and mounted around the headed adjusting screw rod 8, the shock spring 4 is maintained in course when it is alternatively compressed and released, and therefore the shock spring 4 does not rub against the inside wall of the lower cylindrical casing 2 when it is compressed or released. Because of the arrangement of the friction lining 23 and the wear resistant bushing on the lower cylindrical casing 2 and the arrangement of the friction ring 10 on the upper cylindrical casing 9, the area of the slide contact between the upper and lower cylindrical casings 9, 2 is minimized, friction resistance between the upper cylindrical casing 9 and the lower cylindrical casing 2 is relatively reduced, and therefore the service life of the mechanism is greatly prolonged. The arrangement of the friction lining inside the lower cylindrical casing also eliminates the complicated processing process to grind the inside wall of the lower cylindrical casing. Further, the arrangemet of the headed adjusting screw rod permits the spring force of the shock absorbing conical spring to be adjustable.

We claim:

1. A bicycle front fork shock absorbing mechanism comprising:
    a lower cylindrical casing having a friction lining covered around an inside wall thereof and a center screw hole on the inside spaced from a top opening thereof;
    an upper cylindrical casing having a locating block fastened to a bottom end thereof inserted through said top opening into said lower cylindrical casing, said locating block having a stepped through hole through the longitudinal center line thereof;
    a lower rubber ring received inside said lower cylindrical casing and supported above said screw hole;
    a plurality of upper rubber rings received inside said lower cylindrical casing and retained within said locating block;
    a shock absorbing conical spring received inside said lower cylindrical casing and retained between said lower rubber ring and said upper rubber rings;
    a headed adjusting screw rod having a head disposed above said locating block and a screw rod inserted through said stepped through hole on said locating block and said upper rubber rings and said shock absorbing conical spring and said lower rubber ring and then threaded into said screw hole;

a buffer spring mounted around said headed adjusting screw rod and retained between the head of said headed adjusting screw rod and said locating block;

a friction ring mounted around the bottom end of said upper cylindrical casing and connected to said friction lining of said lower cylindrical casing through a slide contact; and a bushing made of wear resistant copper alloy and mounted within said lower cylindrical casing near the top opening thereof and connected around said upper cylindrical casing through a slide contact.

* * * * *

UNITED STATES PATENT AND TRADEMARK OFFICE
CERTIFICATE OF CORRECTION

PATENT NO. : 5,359,910
DATED : November 1, 1994
INVENTOR(S) : Wu-Sung Chang; Huan-Yang Huang It is certified that error appears in the above-identified patent and that said Letters Patent is hereby corrected as shown below:

Title page: Item

[73] Assignee:" is deleted.

Attorney, Agent, or Firm is corrected to read:
--Varndell Legal Group--.

Signed and Sealed this

Tenth Day of November 1998

Attest:

BRUCE LEHMAN

*Attesting Officer*     *Commissioner of Patents and Trademarks*